(12) United States Patent
Waibel et al.

(10) Patent No.: US 7,963,561 B2
(45) Date of Patent: Jun. 21, 2011

(54) STEERING COLUMN FOR A MOTOR VEHICLE

(75) Inventors: Gerhard Waibel, Bildstein (AT); Rene Allgäuer, Altach (AT); Maximilian Auer, Feldkirch (AT); Martin Jenny, Feldkirch (AT)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 574 days.

(21) Appl. No.: 12/149,163

(22) Filed: Apr. 28, 2008

(65) Prior Publication Data
US 2008/0229867 A1 Sep. 25, 2008

Related U.S. Application Data

(63) Continuation of application No. PCT/AT2006/000420, filed on Oct. 12, 2006.

(30) Foreign Application Priority Data

Oct. 28, 2005 (DE) .......................... 10 2005 052 123

(51) Int. Cl.
*B62D 1/19* (2006.01)
*B62D 1/184* (2006.01)
*B62D 1/185* (2006.01)
*B62D 1/187* (2006.01)
*B62D 1/189* (2006.01)

(52) U.S. Cl. .......................................... 280/777; 74/493

(58) Field of Classification Search .................... 74/493, 74/492; 280/777, 775
See application file for complete search history.

(56) References Cited

U.S. PATENT DOCUMENTS 5,082,311 A    1/1992    Melotik
(Continued)

FOREIGN PATENT DOCUMENTS

EP    0 802 104    10/1997
(Continued)

OTHER PUBLICATIONS

International Search Report issued Dec. 14, 2007 in the International (PCT) Application of which the present application is the U.S. National Stage.

*Primary Examiner* — Richard W Ridley
*Assistant Examiner* — Terence Boes
(74) *Attorney, Agent, or Firm* — Wenderoth, Lind & Ponack, L.L.P.

(57) ABSTRACT

A steering column for a motor vehicle is adjustable at least in its longitudinal direction. The steering column includes a support unit chassis of the motor vehicle, a setting unit and a clamping mechanism which comprises a clamp bolt and at least one arrest element cooperating with at least one securement element. At least one arrest element during the closing of the clamping mechanism is displaced in the axial direction of the clamp bolt with respect to the support unit and clamped with a securement element connected with the setting unit, and at least one securement element is connected with the setting unit so that in normal operation it is held nondisplaceably in the longitudinal direction of the steering column with respect to the setting unit and in the event of a crash is displaceable with respect to the setting unit under energy absorption. The support unit includes on both sides of the setting unit side jaws, through which penetrates the clamp bolt through openings. At least one arrest element penetrates the side jaw of the support unit and/or a side shank of an intermediate unit through an opening and is held in the opening of the corresponding side jaw of the support unit and/or in the opening of the corresponding side jaw of the intermediate unit such that it is nondisplaceable in the longitudinal direction of the steering column.

20 Claims, 9 Drawing Sheets

U.S. PATENT DOCUMENTS

| | | |
|---|---|---|
| 5,517,877 A | 5/1996 | Hancock |
| 5,722,299 A | 3/1998 | Yamamoto et al. |
| 5,988,679 A | 11/1999 | Schelling et al. |
| 6,095,012 A | 8/2000 | Lutz |
| 6,419,269 B1 | 7/2002 | Manwaring et al. |
| 6,616,185 B2 | 9/2003 | Manwaring et al. |
| 6,848,716 B2 | 2/2005 | Lutz |
| 7,484,430 B2 * | 2/2009 | Schulz ............................ 74/493 |
| 7,607,696 B2 * | 10/2009 | Graf .............................. 280/775 |
| 2003/0057694 A1 | 3/2003 | Manwaring et al. |
| 2004/0012185 A1 | 1/2004 | Lutz |
| 2004/0155448 A1 | 8/2004 | Klukowski et al. |
| 2006/0207379 A1 | 9/2006 | Riefe et al. |
| 2006/0273568 A1 * | 12/2006 | Manwaring et al. .......... 280/777 |

FOREIGN PATENT DOCUMENTS

| | | |
|---|---|---|
| EP | 0 836 981 | 4/1998 |
| EP | 0 849 141 | 6/1998 |
| EP | 1 093 990 | 4/2001 |
| EP | 1 382 509 | 1/2004 |
| EP | 1 433 687 | 6/2004 |
| EP | 1 464 560 | 10/2004 |
| EP | 1 705 098 | 9/2006 |

* cited by examiner

STEERING COLUMN FOR A MOTOR VEHICLE

This application is a continuation of International Application No. PCT/AT2006/000420, filed Oct. 12, 2006. The entire disclosure of International Application No. PCT/AT2006/000420 is incorporated herein by reference.

BACKGROUND OF THE INVENTION a) Field of the Invention

The invention relates to a steering column for a motor vehicle which is displaceable in at least its longitudinal direction, comprising a support unit connectable with the chassis of the motor vehicle, a setting unit and a clamping mechanism. In the opened state of the clamping mechanism, the setting unit is at least displaceable with respect to the support unit in the longitudinal direction of the steering column, and in the closed state of the clamping mechanism the set position of the setting unit is secured in position with respect to the support unit. The clamping mechanism comprises a clamp bolt and at least one arrest element cooperating with at least one securement element. At least one arrest element during the closing of the clamping mechanism is displaced in the axial direction of the clamp bolt with respect to the support unit and is clamped with a securement element connected with the setting unit, and at least one securement element is connected with the setting unit so that during normal operation it is held nondisplaceable with respect to the setting unit in the longitudinal direction of the steering column and, in the event of a crash, is dislocatable with respect to the setting unit with the absorption of energy.

b) Description of Related Prior Art

Adjustable steering columns serving for the adaptation of the position of the steering wheel to the seating position of the driver are known in various embodiments. Apart from adjustable steering columns which are only adjustable in length or height and inclination direction, respectively, steering columns are known which are adjustable in length as well as also height and inclination direction, respectively.

Adjustable steering columns, in which the set position is fixed by means of a clamping mechanism, in which the clamping mechanism holds securement elements in engagement with one another, and in which elements cooperate under frictional and/or positive locking, are disclosed, for example, in EP 0 802 104 B1, EP 0 836 981 B1, U.S. Pat. No. 5,722,299 A or EP 1 382 509 A1. In the case of the adjustable steering column of EP 0 802 104 B1, in the closed state of the clamping mechanism, (lamella) disk packs are tightened with one another, and one of the disk packs is disposed on the setting unit or jacket unit and the other on the support unit. In the case of the device of EP 0 836 981 B1, in the closed state of the clamping unit toothings are brought into engagement with one another, which block a dislocation of the steering column. The support unit herein comprises only one shank on one side of the setting unit, and the setting unit is tightened against the shank in the closed state of the clamping mechanism. U.S. Pat. No. 5,722,299 A also discloses, in particular in the embodiment examples according to FIGS. 28 to 39, a clamping mechanism in which securement elements cooperate via toothings under positive locking. The support unit comprises side jaws located on both sides of the setting unit, and the jaws penetrate through openings by the clamp bolt of the clamping mechanism. In the steering column of EP 1 382 509 A1, snap bolts and bores are provided as cooperating securement elements into which the snap bolts can engage.

It is further known to connect the steering column of a motor vehicle via energy-consuming means with the chassis of the motor vehicle. Conventionally in adjustable steering columns the support unit, in a manner consuming energy, is connected displaceably with a chassis part disposed on the chassis of the motor vehicle. Such a design is shown, for example, in U.S. Pat. No. 5,517,877 A. In non-adjustable steering columns, the jacket tube itself is connected such that it consumes energy, with the chassis of the motor vehicle as is shown, for example, in U.S. Pat. No. 5,082,311 A. The energy-absorbing device in this steering column is formed by holding brackets disposed on the jacket tube, which have elongated holes extending in the longitudinal direction of the jacket tube. The elongated holes are penetrated by a bolt which extends further through a bore in a chassis-stationary part. In the event of a crash, the jacket tube, together with the holding brackets disposed on the jacket tube, is displaced with respect to the bolts, wherein these [bolts] widen the elongated holes with the absorption of kinetic energy of the jacket tube.

A steering column of the type described in the introduction is further disclosed in EP 0 849 141 A1. On the jacket tube are secured mounting flanges which delimit a slot extending in the longitudinal direction of the jacket tube. A securement element for the securement of the longitudinal displacement of the steering column is guided between these mounting flanges such that it is displaceable in the longitudinal direction of the steering column. A clamp bolt penetrates through an opening in a side shank, disposed on one side of the jacket tube, of a chassis-stationary support unit and an elongated hole in the securement element extending in the longitudinal direction of the steering column. In its closed state, a clamping mechanism fixes the set position of the steering column. The clamping mechanism clamps the side face of the securement element facing the side shank of the support unit with the side face of the side shank facing this securement element, of the support unit which, consequently, forms a further securement element for securing in position the longitudinal adjustment of the steering column. Furthermore, the L-shaped mounting flanges disposed on the jacket tube in the closed state of the clamping mechanism are clamped through the clamping force exerted by the clamping mechanism additionally into slots of the securement element guided on the mounting flanges such that it is displaceable in the longitudinal direction. In the event of a crash, the securement element can be displaced with respect to the mounting flanges while overcoming the friction in effect between these parts. Although this design permits a compact structure, this device, inter alia, has a disadvantage in that the extent of the energy absorption between the mounting flanges of the jacket tube and the securement element depends on the clamping force of the clamping mechanism. This clamping force can change over the course of time. The development of a predetermined force-path diagram for the energy absorption of the crash energy is not possible in a satisfactory manner.

SUMMARY OF THE INVENTION

The invention addresses the problem of providing a steering column of the above-described type, in which, during normal operation a reliable securement in position of the set position of the steering column becomes possible, wherein vibrations of the setting unit with respect to the support unit are avoided and in which the energy absorption in the event of a crash can be predetermined with adequate precision.

This is accomplished according to the invention through a steering column for a motor vehicle, which is adjustable at least in its longitudinal direction. The steering column comprises a support unit connectable with the chassis of the motor vehicle and comprising side jaws, a setting unit located on both sides at which the side jaws are located and with which at least one securement element is connected, and a clamping mechanism. In the opened state of the clamping mechanism, the setting unit is displaceable with respect to the support unit at least in the longitudinal direction of the steering column, and in the closed state of the clamping mechanism, the set position of the setting unit with respect to the support unit is secured in position. The clamping mechanism comprises a clamp bolt penetrating openings in the side jaws and at least one arrest element cooperating with the securement elements or one of the securement elements.

At least one arrest element during the closing of the clamping mechanism is displaced in the axial direction of the clamp bolt with respect to the support unit and is clamped with the securement element or one of the securement elements. At least one of the securement elements is connected with the setting unit so that in normal operation it is held nondisplaceable in the longitudinal direction of the steering column with respect to the setting unit and in the event of a crash is displaceable with respect to the setting unit under energy absorption. At least one arrest element penetrates the side of the support unit and/or a side shank of an intermediate unit, disposed between the side jaws of the support unit and the setting unit, through an opening and is held in the opening of the corresponding side jaw of the support unit and/or in the opening of the corresponding side shank of the intermediate unit such that it is nondisplaceable in the longitudinal direction of the steering column.

In a preferred embodiment of the invention, at least one securement element comprises at least one bolt disposed on the side directed toward the setting unit. The bolt is guided in an elongated hole in the setting unit or in an energy absorption part disposed on the setting unit, and widens this elongated hole upon the displacement of the setting unit occurring in the event of a crash in the longitudinal direction of the steering column with respect to the second securement element.

A steering column according to the invention makes possible a compact structure at a well defined energy absorption behavior in the event of a crash. Furthermore, high stability in the closed state of the clamping mechanism, for example against vibrations, can be attained.

In an advantageous embodiment of the invention one or several arrest elements and one or several securement elements of the length adjustment extend one into the other under positive locking in the closed state of the clamping mechanism, preferably via toothings disposed on these securement elements. Thereby a high holding force against the unintentional dislocation between the securement elements is attained and this is possible for normal operation as well as also for a crash.

If, within the scope of this document, "normal operation" is discussed, this normal operation is present if the forces acting onto the steering column do not exceed a predetermined limit value (in a particular displacement direction), while "in the event of a crash" the acting forces are above this limit value.

It is preferred that a steering column according to the invention is not only adjustable in the longitudinal direction but also in inclination or height. In the closed state of the clamping mechanism, first and second height securement elements are clamped with one another, which secure the inclination or height adjustment in position. These height securement elements preferably cooperate again under positive locking.

In an advantageous embodiment of the invention, a device is provided by means of which in the event of a crash, for example after a predetermined time or a predetermined displacement distance, at least one of the arrest elements can (for the longitudinal adjustment) be brought out of engagement of the associated securement element. This device can herein comprise, for example, a pyrotechnical element or an electromagnetic element or an element mechanically actuated through a dislocation in the event of a crash for pulling back the arrest element. Alternatively, or in combination, it can also be provided to bring one or several arrest elements additionally into engagement with particular securement elements.

In a further independent aspect, the problem of the invention comprises, in an at least height or inclination direction adjustable steering column, absorbing a stroke from the engine side in the event of a crash. This is attained according to the invention in a steering column which by swivelling about a swivel axis is at least height and inclination adjustable, respectively, wherein the swivel axis is defined by at least one swivel bolt so that the swivel bolt is guided in at least one elongated hole such that it is displaceable.

This displacement of the swivel bolt in the elongated hole can herein take place in an advantageous embodiment with the absorption of energy, in particular through friction and/or deformation.

Further advantages and details of the invention will be explained in the following in conjunction with the attached drawings:

DETAILED DESCRIPTION OF THE PREFERRED EMBODIMENTS

Figure 1:
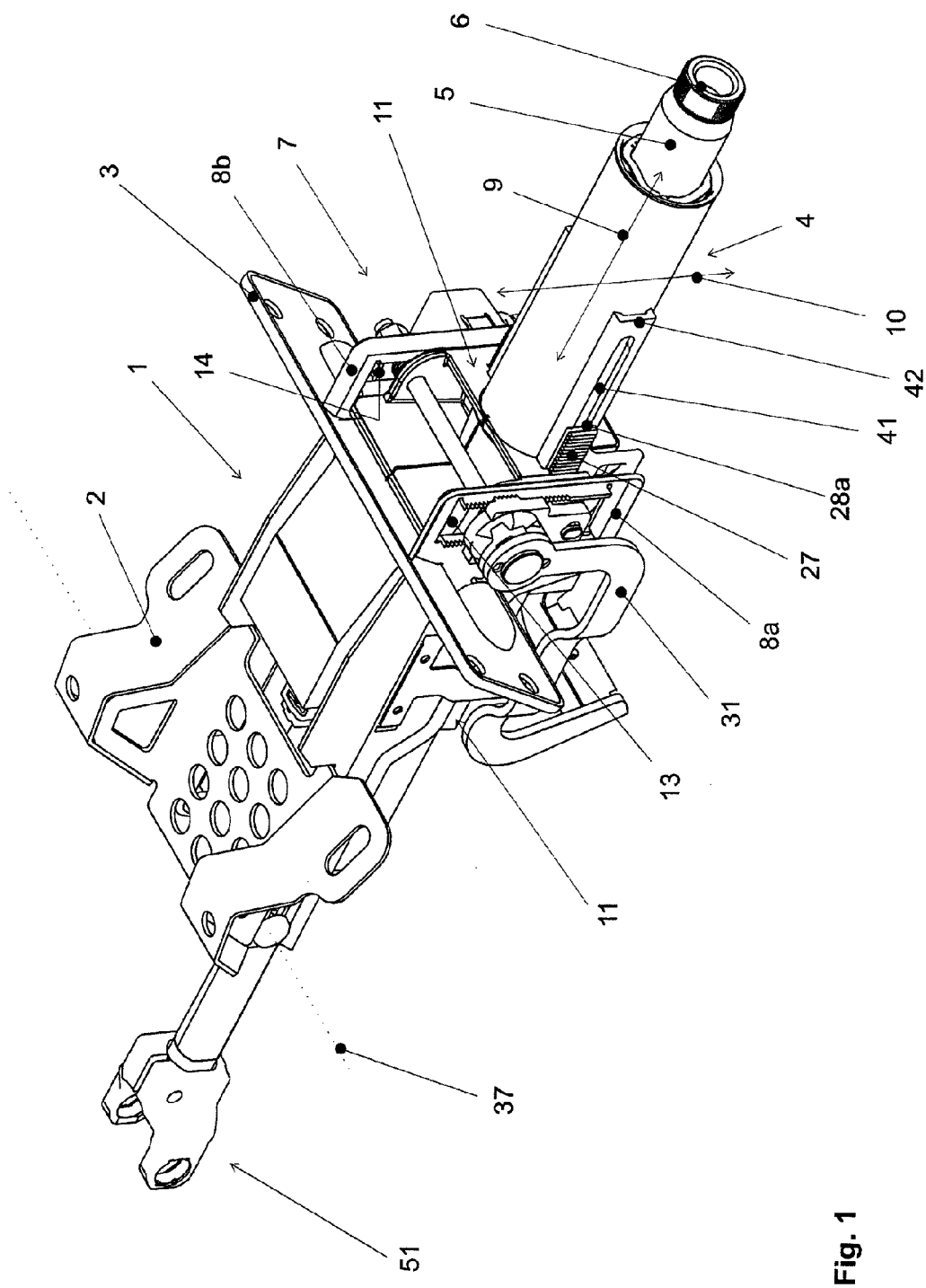
FIG. 1 is an oblique view of the section adjoining the steering wheel of a steering column according to a first embodiment.
Figure 2:
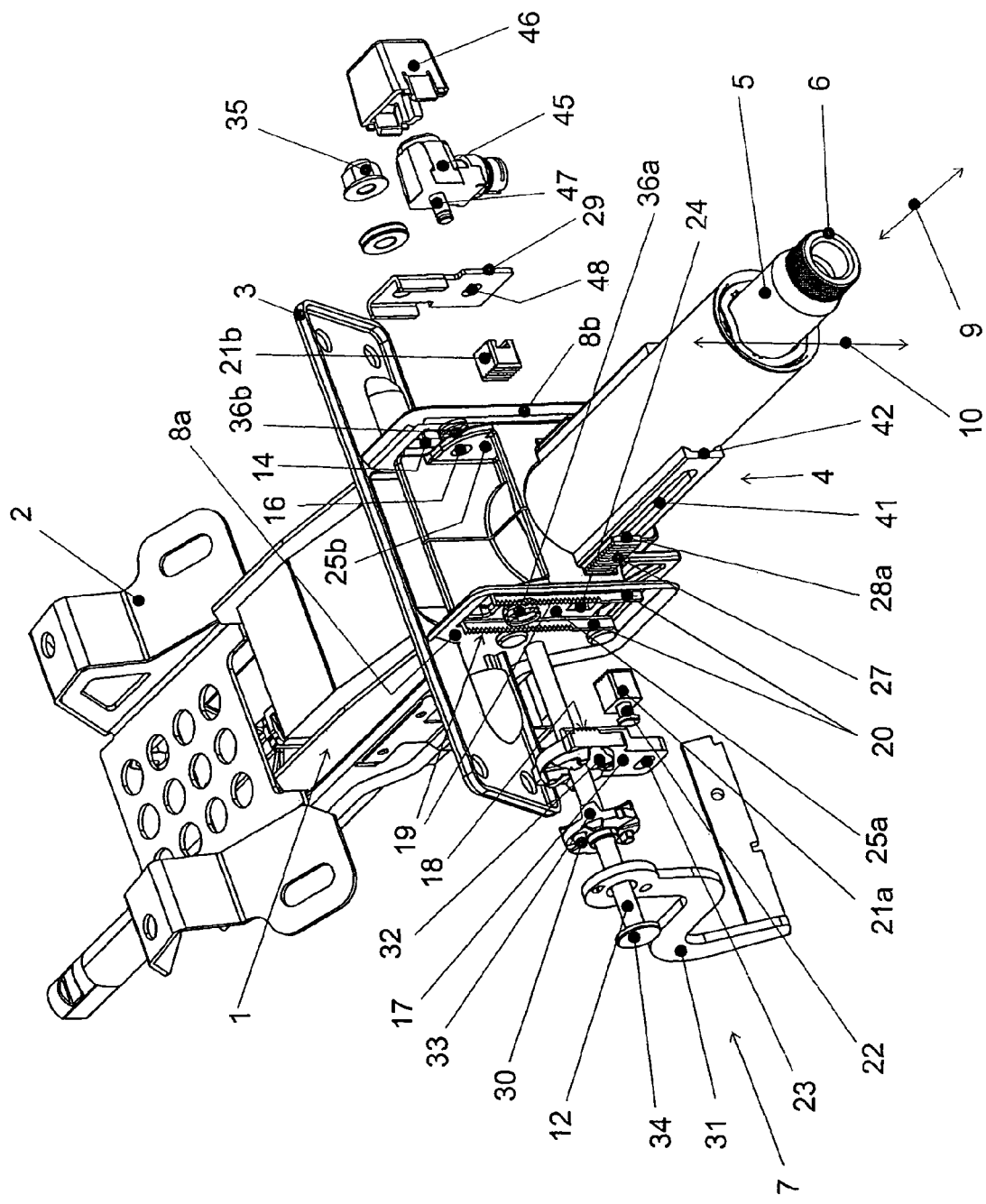
FIGS. 2 and 3 are pulled apart (exploded) representations of parts of the clamping mechanism of the steering column in oblique views from different viewing directions.
Figure 3:
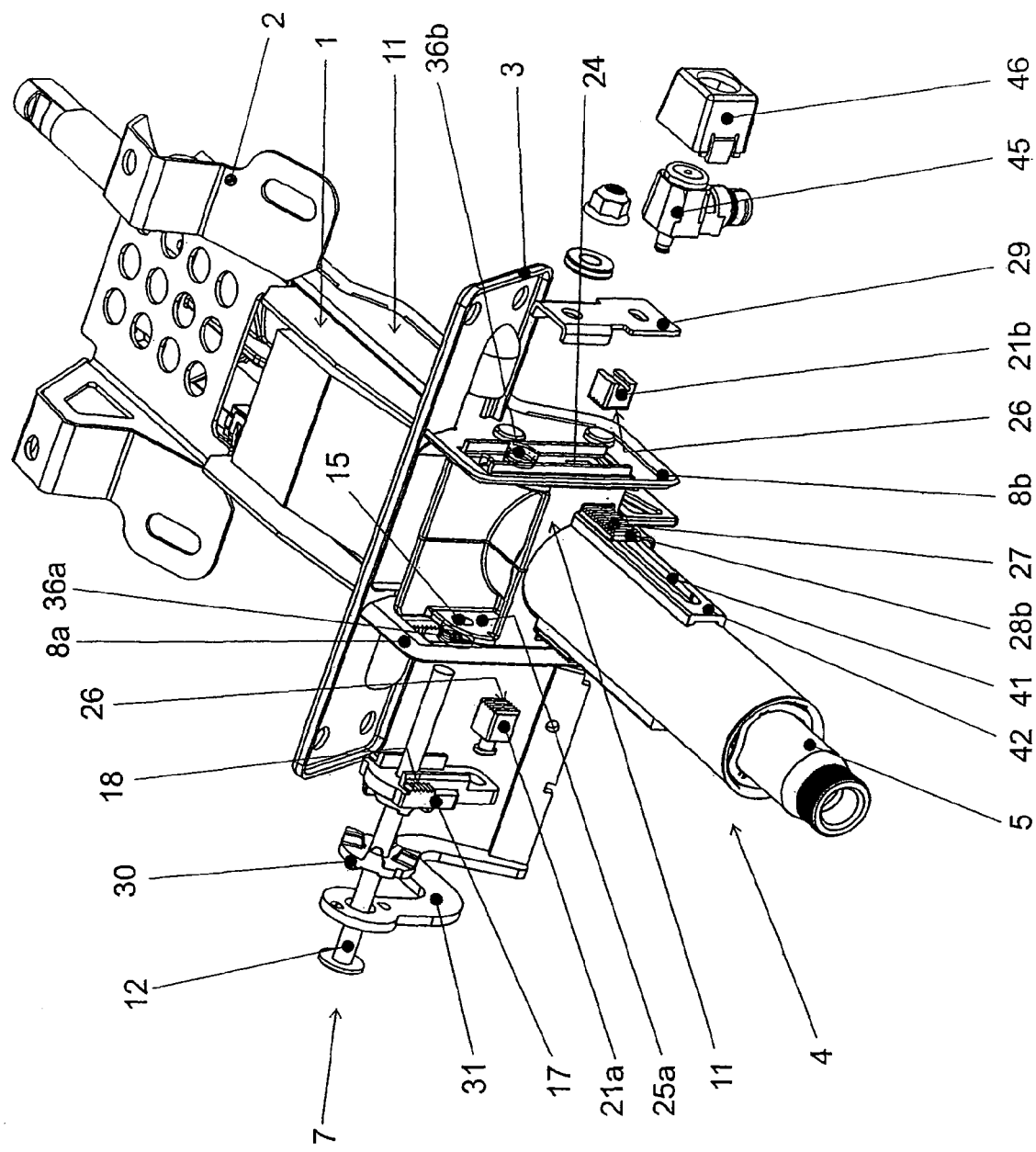
Figure 4:
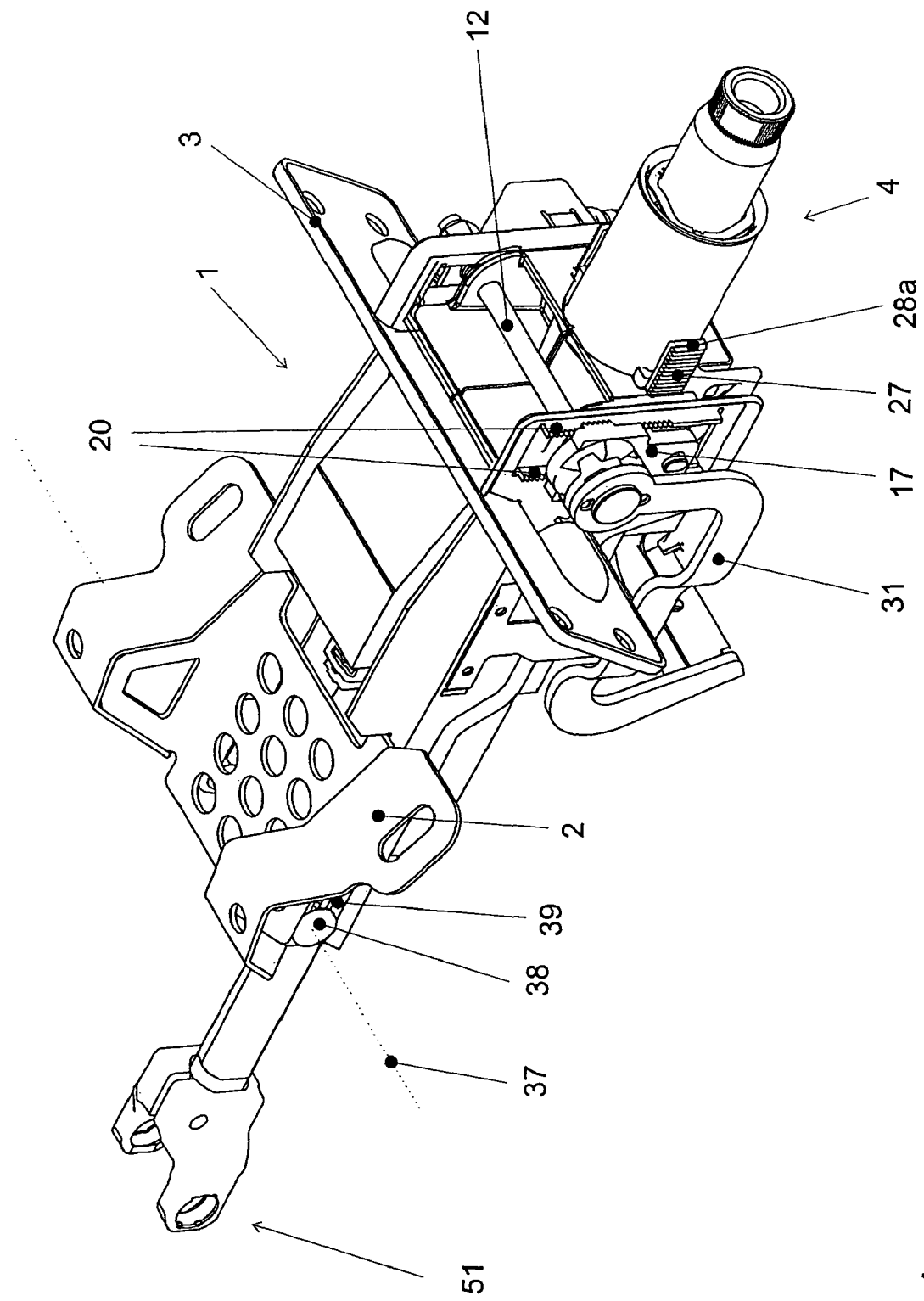
FIG. 4 is an oblique view of the steering column in the state after a crash.
Figure 5:
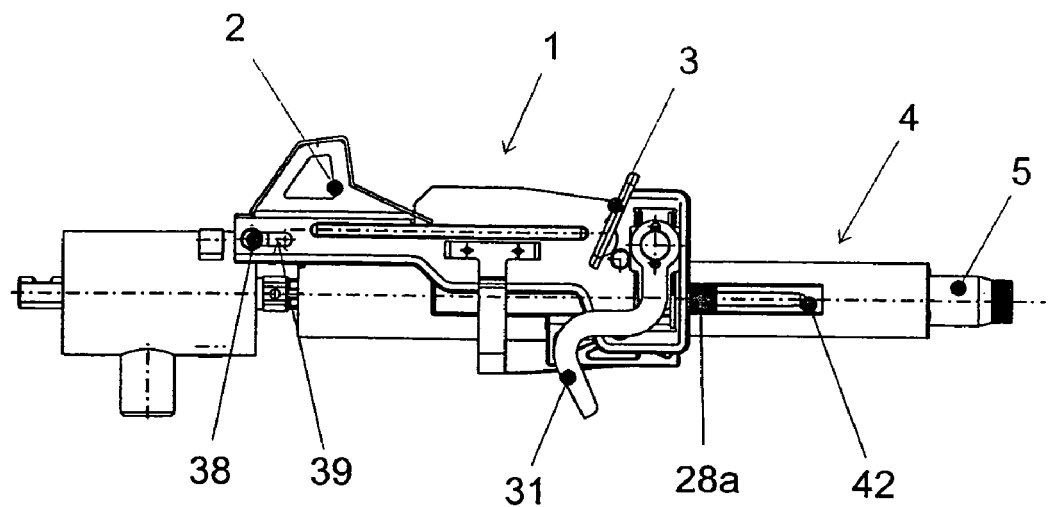
FIG. 5 and FIG. 6 are side views of the steering column before and after the crash.
Figure 6:
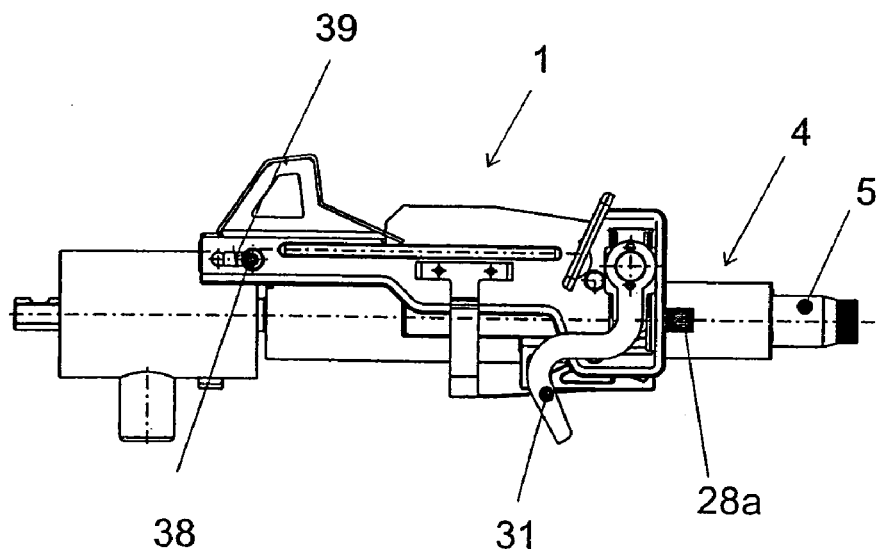

A first embodiment of a steering column according to the invention is shown in FIGS. 1 to 8. The steering column comprises a support unit 1, connectable with the chassis of the motor vehicle and which in this embodiment comprises first and second bracket parts 2, 3 connected with one another.

A setting unit 4, implemented in the form of a jacket tube and pivotably supporting a section of the steering spindle 5, is adjustable with respect to the support unit for the adaptation of the position of the steering wheel (not shown in the Figures and mountable at the end 6 of the steering spindle 5) to the seating position of the driver with respect to the support unit 1 if a clamping mechanism 7 described more precisely later is in its opened state.

The setting unit 4 is disposed between side jaws 8a, 8b of the bracket part 3 of the support unit 1.

In the depicted embodiment, the setting unit 4 is displaceable in the longitudinal direction 9 of the steering column as well as also in the displacement direction 10 for the inclination or height adjustment of the steering column. Between the side jaws 8a, 8b of support unit 1 and the setting unit 4 an intermediate unit 11 is herein disposed annularly encompassing the setting unit 4. This intermediate unit 11 is displaceable with respect to the support unit 1 in the displacement direction 10 corresponding to the height or inclination adjustment and nondisplaceable with respect to setting unit 4 into this displacement direction. In the longitudinal direction 9 of the steering column, in contrast, the intermediate unit 11 is connected nondisplaceably with the support unit 1, and the setting unit 4 is supported displaceably with respect to the intermediate unit 11.

A clamping mechanism 7 is provided for fixing the set position of the steering column, and the clamping mechanism 7 comprises a clamp bolt 12 extending transversely to the steering spindle 5, in particular at right angles to the longitudinal direction 9 of the steering column. The bolts penetrate openings 13, 14 in the side jaws 8a, 8b and openings 15, 16 in side shanks 25a, 25b of the intermediate unit 11. The openings 13, 14 are developed in the form of elongated holes extending in the displacement direction 10. The openings 15, 16 in the intermediate unit 11 hold the clamp bolt 12 such that it is nondisplaceable relative to the displacement direction 10 (apart from play for the sliding guidance of the clamp bolt) with respect to the intermediate unit 11.

Disposed on the clamp bolt 12 is a height arrest element 17 which includes toothings 18 on the side facing the adjacent side jaw 8 of support unit 1 on both sides of the clamp bolt 12. In the closed state of the clamping mechanism 7, these toothings 18 cooperate with toothings 19 of toothed racks disposed on both sides of opening 13 on side jaw 8, which toothed racks form a height securement element 20. Toothings 18, 19 extend in the displacement direction 10, in the depicted embodiment in a straight line, wherein in principle a curved course is also conceivable and feasible.

At the first height arrest element 17 is disposed a clamping block which forms an arrest element 21a for fixing the setting of the steering column in the longitudinal direction 9 in the closed state of the clamping mechanism 7. In the example, the arrest element 21a is fastened to height arrest element 17 by means of a bolt 22 disposed on it and penetrating an opening 23 in the height arrest element 17.

The arrest element 21a in its entirety is located on one side of the clamp bolt 12 (thus does not comprise sections on both sides of the clamp bolt) and penetrates the opening 13 in side jaw 8 as well as an opening formed in the shape of a window cutout in a side shank 25a of the intermediate unit 11. The arrest element 21a is stayed against a dislocation in the longitudinal direction 9 of the steering column on the edges of this opening 24 in side shank 25a of the intermediate unit 11.

On its side facing the setting unit 4, the arrest element 21a includes a toothing 26, which, in the closed state of the clamping mechanism 7, engages into a toothing 27 of a securement element 28a connected with the setting unit 4. In the example, this connection of the securement element 28a with the setting unit 4 takes place in the region of a plane extending through the longitudinal axis of the steering spindle 5 and perpendicular to a vertical plane extending through the longitudinal axis of the steering spindle 5. Alternatively, this connection of the securement element 28a with the setting unit 4 in the region of a plane can be arranged to extend parallel and offset to the longitudinal axis of steering spindle 5. The position with respect to the longitudinal axis of steering spindle 5 can be adapted to the constructional requirements without encountering problems.

The plane in the region of which the connection of securement element 28a with the setting unit 4 takes place is preferably parallel to the axis of the clamp bolt 12 and offset with respect to clamp bolt 12 (i.e. the clamp bolt 12 is not located within this plane).

The height arrest element 17 is guided such that it is displaceable in the displacement direction 10 with respect to the side jaw 8a and is herein secured against a twisting about the axis of clamp bolt 12.

On the opposite side of setting unit 4, a connection plate 29 is disposed on the clamp bolt 12, which plate is guided on the side jaw 8b such that it is displaceable in the displacement direction 10 and is herein secured against a twisting about the axis of the clamp bolt 12. The connection plate 29 is connected to a clamping block which in this embodiment represents a further (second) arrest element 21b for fixing the longitudinal adjustment of the steering column. Like the first arrest element 21a, the second arrest element 21b is located in its entirety on one side of clamp bolt 12 and projects through opening 14 in side jaw 8b and through an opening 24 developed in the form of a window cutout in side shank 25b of the intermediate unit 11, and the further (second) arrest element 21b is secured in the cutout against dislocation in the longitudinal direction 9 of the steering column. In the closed state of clamping mechanism 7, the toothing 26 of the second arrest element 21b cooperates again with the toothing 27 of a further (second) securement element 28b connected with the setting unit 4.

The connection of the further arrest element 21b with connection plate 29 will be described in further detail later.

The clamping mechanism 7 further comprises a clamp member 30 disposed rotatably on the clamp bolt 12, on which member is disposed a clamping lever 31 by which the clamp member 30 is rotatable about the longitudinal axis of the clamp bolt 12. Cooperating with the clamp member 30 is the lateral face of the first height arrest element 17 facing the clamp member 30. This side face of the first height arrest element 17 includes ramps or oblique faces 32, which cooperate with cam extensions 33 of the clamp member 30. Alternatively, rolling bodies guided in curved tracks or other generally known clamping mechanisms can also assume the clamping function.

When rotating the clamp member 30 by means of clamping lever 31 between the open position of clamp member 30 and the closed position of clamp member 30, the cam extensions 33 slide out along the oblique faces 32. The end piece 34, developed in the shape of an enlarged head, of clamp bolt 12 is displaced in the axial direction away from the side jaw 8 of support unit 1, such that the opposite end piece 35 of clamp bolt 12 developed in the form of a nut is displaced in the direction toward side jaw 8b, and the first height arrest element 17 is displaced in the axial direction of clamp bolt 12 in the direction toward the side jaw 8a. The first height arrest element 17 herein entrains the first arrest element 21a in the axial direction of clamp bolt 12, and the end piece 35 entrains the connection plate 29, and thus the second arrest element 21b, in the axial direction of clamp bolt 12. The toothings 18 of the height arrest element 17 are brought into engagement with the toothings 19 of the height securement element 20, and the toothings of arrest elements 21a, 21b are brought into engagement with the toothings of securement elements 28a, 28b.

Under a force acting in the closed state of the clamping mechanism 7 in the longitudinal direction of the steering column onto the setting unit 4, the force is transferred from at least one securement element 28a, 28b onto the at least one arrest element 21a, 21b and from it beyond the edge of opening 24 in side shank 25a, 25b of the intermediate unit 11 and beyond it onto the support unit 1.

When, starting from its closed state, the clamping mechanism 7 by swivelling of clamping lever 31 is brought into its opened state, springs 36a, 36b space apart the toothings 18, 19 and 26, 27, respectively, which springs are disposed between the side shanks 25a, 25b of the intermediate unit 11 and, on the one hand, the first height arrest element 17, on the other hand, the connection plate 29, and the position of the steering column is adjustable.

The height or inclination adjustment of the steering column takes place by swivelling the setting unit 4 with respect to the support unit 1 about the swivel axis 37. Herein, the swivel axis is secured in position through swivel bolts 38 connected with the intermediate unit 11. In the depicted embodiments, the swivel bolts 38 are guided in two elongated holes 39 disposed on the support unit 1 and extending in the longitudinal direction 9 of the steering column, in order to represent an additional displacement path in the longitudinal direction 9 of the steering column for the setting unit 4 with respect to the support unit 1 in the event of a crash. In the event of a crash, the swivel axis 37 can be displaced accordingly along the at least one elongated hole 39. Therein energy is preferably absorbed, for example through friction and/or deformation. This is illustrated by the displacement of the swivel bolt in FIG. 6. This implementation is especially advantageous for the absorbing of a front wall intrusion.

However, the invention can be embodied in the same way if the swivel bolts 38 were fastened such that they are not longitudinally displaceable but only exclusively swivellable, for example in circular cutouts on the support unit 1.

Longitudinal displaceability of the swivel bolt 38 in an elongated hole 39 could also be provided in a steering column which is only height or inclination adjustable in order to absorb a stroke from the side of the engine in the event of a crash. An intermediate unit 11 could in this case be omitted (or be implemented integrally with the setting unit 4). The at least one elongated hole 39 would in this case be disposed in the setting unit 4.

The disposition of the swivel bolt 38 and of the elongated holes 39 could also be interchanged. For example, a continuous swivel bolt could also be provided which is guided displaceably in two elongated holes.

In the adjustment along the longitudinal direction 9 and/or of the height or inclination of the steering column, in the embodiments the position of the universal joint 51 is changed relative to the automobile body or the bracket parts 2, 3. However, alternative structures are also conceivable and feasible, in which the swivelling of the setting unit 4 takes place in the universal joint 51. In this case, the universal joint can assume either an unchangeable position with respect to the body and/or the bracket 2, 3, apart from the rotation about the own axis, or change its position along the longitudinal direction 9 only in the event of the adjustment along the longitudinal direction 9 of the steering column.

On each side of each securement element 28a, 28b directed toward the setting unit 4, a bolt 40 is disposed projecting into an elongated hole 41 of an energy absorption part 42, which is secured in position on the setting unit 4. The elongated hole 41 extends in the longitudinal direction 9 of the steering column. In the proximity of its end facing away from the steering wheel-side end 6 of steering spindle 5, the elongated hole 41 has widenings 43 formed by trough-shaped depressions in the longitudinal edges of elongated hole 41. In normal operation, the bolt 40 engaging into the particular elongated hole 41 is located in the proximity of the end, remote from the steering wheel, of the elongated hole 41 so that lateral widenings 44 of bolt 40 project into widenings 43 of the elongated hole 41. The displacement of bolt 40 with respect to the elongated hole 41 is consequently in normal operation blocked by this positive-locking connection between bolt 40 and the energy absorption part 42.

Figure 8:
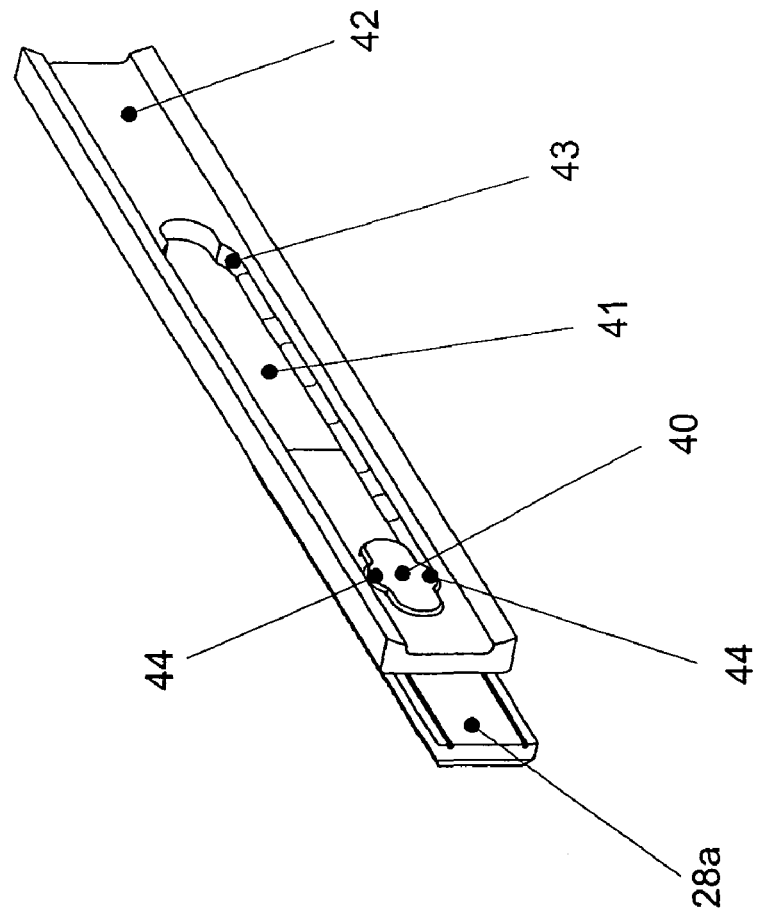
FIG. 7 and FIG. 8 are oblique views of the energy absorption part and the securement element connected with it seen from the side of the setting unit, before and after a crash.
Figure 7:
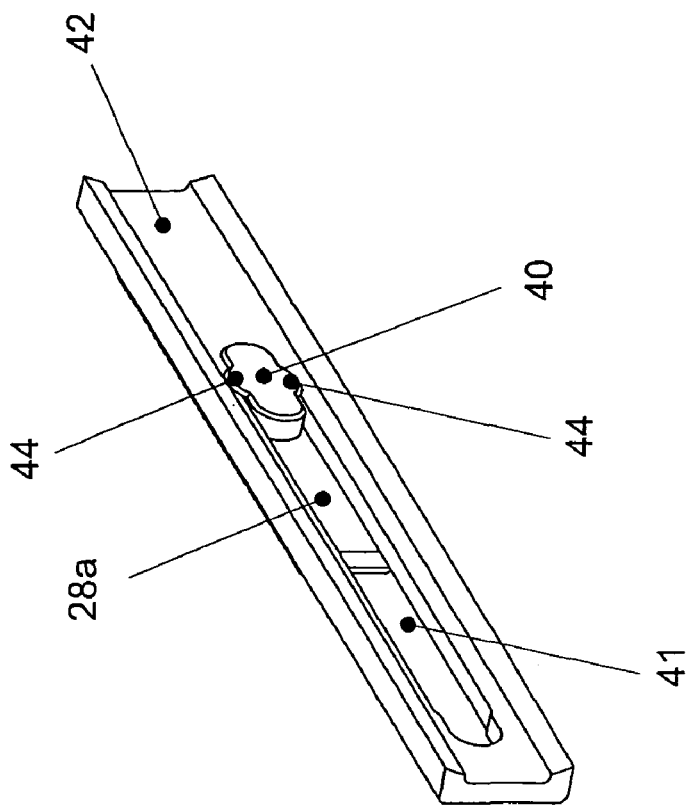

In the event of a crash, the bolts 40 deform the elongated holes 41, wherein the widenings 44 of the bolts 40 widen the elongated holes 41, while the bolts 40 are displaced in the elongated holes 41 in the direction toward the steering wheel-side end of the elongated holes 41. FIG. 8 shows the final state in which the particular bolt 40 reaches the steering wheel-side end of the elongated hole 41.

Through the suitable adaptation of the widths of the elongated holes 41 over their extent, the displacement force of the securement elements 28a, 28b over its displacement path can each be set to desired values in order to attain a predetermined force-path diagram.

Various modifications of the shapes of bolts 40 and of the contours of the elongated holes 41 are conceivable and feasible. For example, the bolts 40 could also be formed with a circular cross section. The bolts can also additionally be connected in a clamping manner with the energy absorption parts.

However, alternatively, other absorption mechanisms are also conceivable and feasible, such as for example a bending flap and/or a tearing flap.

The advantage of the solution according to the invention is that the magnitude of the energy absorption in the closed state of the clamping mechanism is highly decoupled from the closure stress in the clamping mechanism 7, although the system is structured compactly. The clamp bolt 12 penetrating the openings 13, 14 in the side jaws 8a, 8b brings at least one arrest element 21a into engagement with a securement element 28a. The applied stress serves only for securing the engagement, which is preferably a positive locking, while the energy absorption takes place between the securement element 28a and the energy absorption part 42. The solution according to the invention permits simultaneously the problem-free integration of an additional height or inclination adjustment of the steering column.

The further arrest element 21b is connected with the connection plate 29 via a pyrotechnical element 45. The pyrotechnical element 45 is disposed on the connection plate 29 by means of a fastening part 46, the fastening part 46, for example, being snapped in at the edges of the connection plate 29. A holding bolt 47 penetrates a bore 48 of the connection plate 29 and on this holding bolt 47 the second arrest element 21b is secured in position.

In normal operation, the second arrest element 21b, as described, is in engagement with the second securement element 28b, if the clamping mechanism 7 is in its closed state. In the event of a crash, the second arrest element 21b can be brought out of engagement with the second securement element 28b by means of the pyrotechnical element 45, for example after a predetermined time or a predetermined displacement distance. Herein, the holding bolt 47 is pulled back through ignition of the propelling charge of the pyrotechnical element 45, wherein the second arrest element 21b is raised (separated) from the second securement element 28b. Subsequently, only an energy absorption between the first securement element 28a and the energy absorption part 42 cooperating with this first securement element 28a takes place, whereby the further displacement of the setting unit 4 with respect to the support unit 1 becomes "softer".

The solution according to the invention can also be further developed to the extent that a second arrest element 21b is only brought into engagement with a second securement element 28b in the event of a crash, for example after passage of a certain predetermined displacement of the setting unit 4 with respect to the support unit 1. In this case, the displacement of the setting 4 becomes "harder". In such a case, a pyrotechnical element is provided that presses the arrest element 21 at a predeterminable point in time or displacement path of the setting unit 4 onto the corresponding securement element 28b.

Instead of a pyrotechnical element 45, another actuator, for example an electromagnetically acting actuator, could be provided in all embodiments, in order to bring the first securement element 28a in the closed state of the clamping mechanism 7 out of engagement with the further securement element 28b. A mechanically acting part could also be provided which raises the further arrest element 21b after a predetermined displacement distance from the further securement element 28b.

By means of such a device, with which in the event of a crash an arrest element 21b can be brought out of engagement or into engagement with an associated securement element 28b, adaptation of the energy absorption to the weight of the driver could, for example, also take place.

More than two arrest elements 21a, 21b and securement elements 28a, 28b cooperating with them could also be provided, wherein such a device, which comprises for example a pyrotechnical element 45, could also be provided for more than one arrest element for the control of the intervention.

The embodiment can in principle also be modified such that all arrest elements can be brought out of engagement or into engagement with the particular securement elements through an appropriate element 45. Thereby, the multiplicity of the control capabilities for the energy absorption can be further increased and the absorption capability can be still further decreased should it be necessary.

The magnitude of the energy absorption could also be set differingly in the described manner for example as a function of the type of accident.

Figure 9:
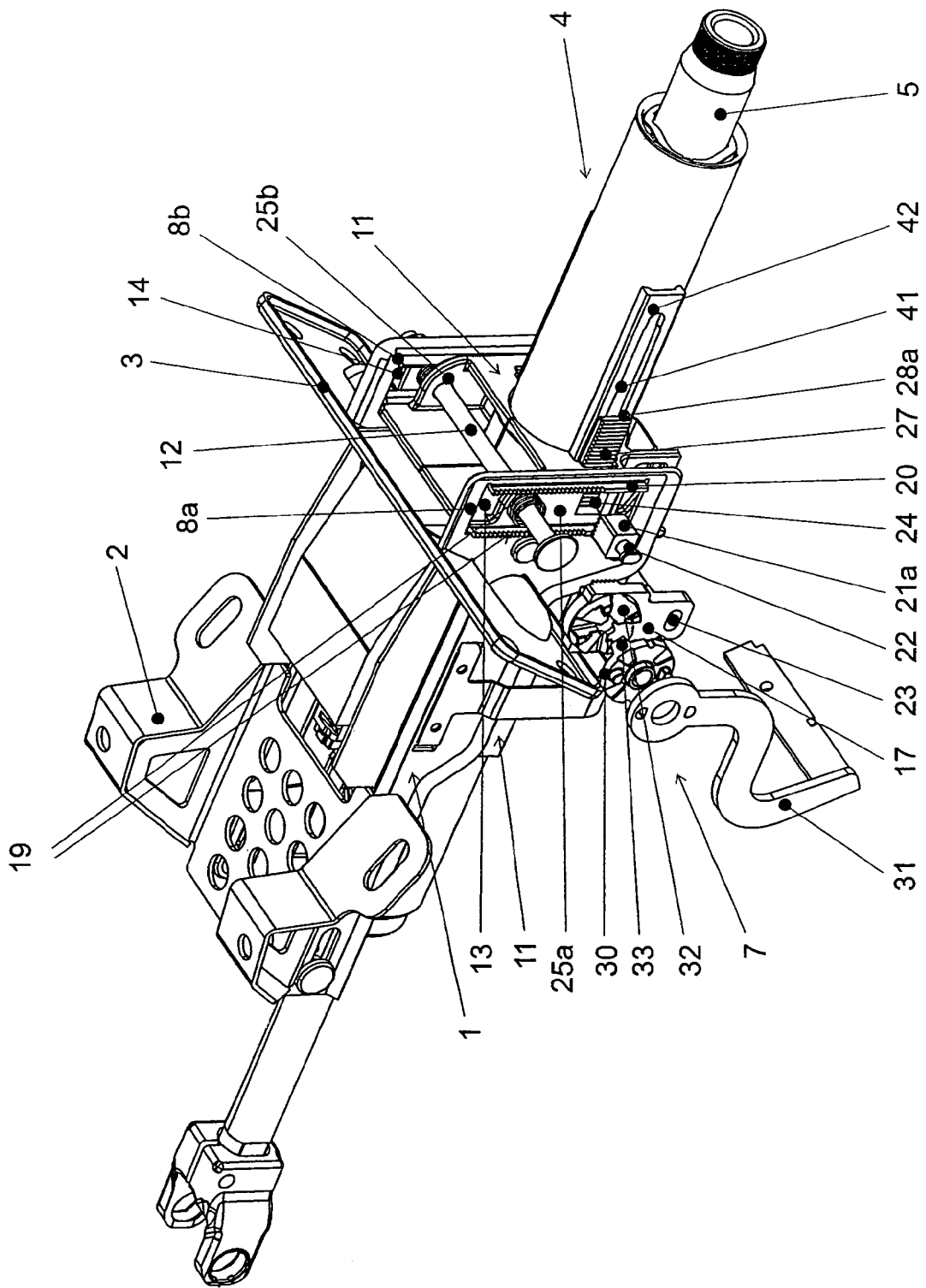
FIG. 9 and FIG. 10 are oblique views of a second embodiment variant of the invention from different viewing directions, parts of the clamping mechanism each shown pulled apart from one another.
Figure 10:
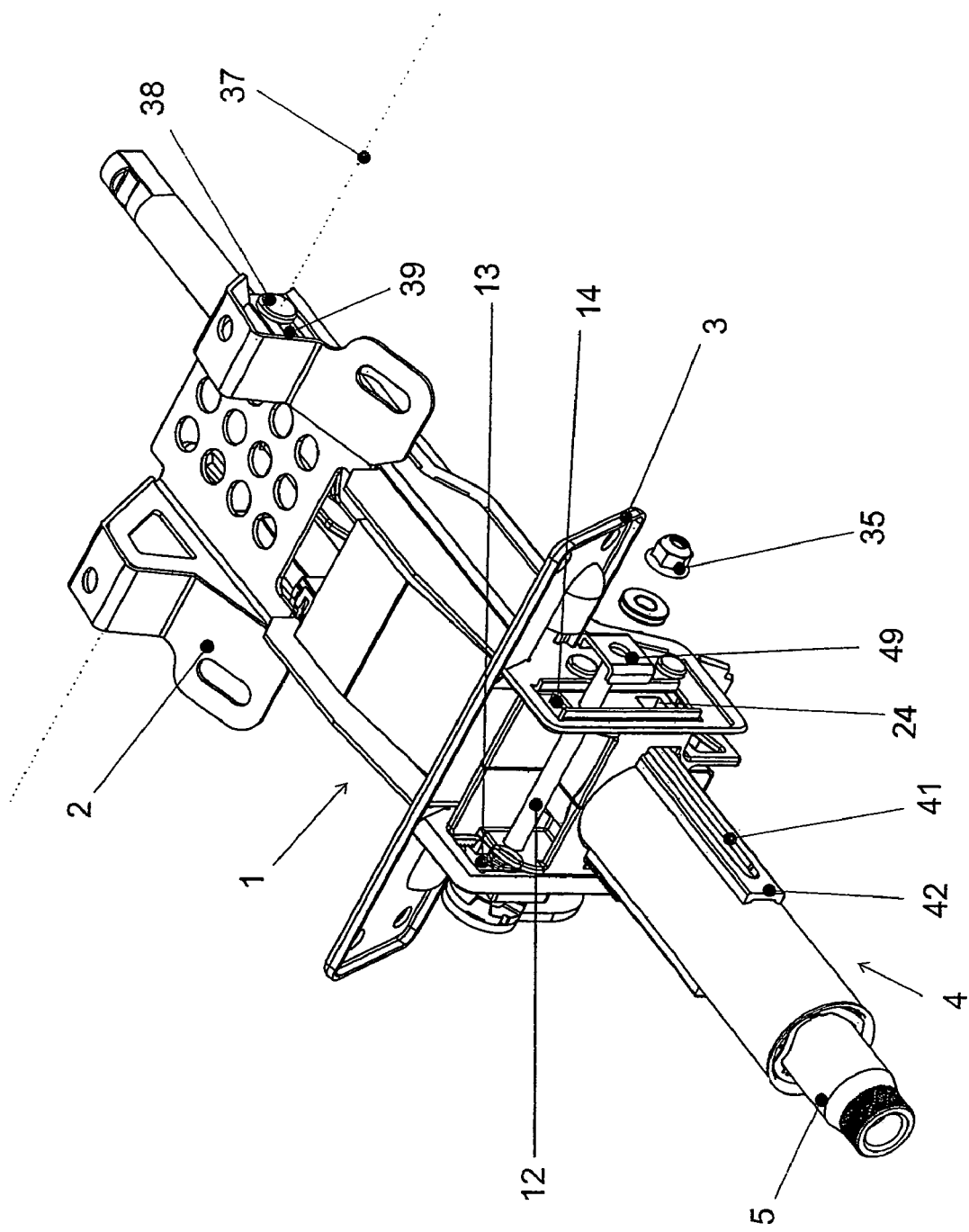

FIGS. 9 and 10 depict an embodiment which is slightly simplified compared to the previously described embodiment example. The difference is that in this embodiment only on one side of the setting unit an arrest element 21a and a securement element 28a are provided. On this side is located, as previously, the height arrest element 17 and the height securement element 20. On the opposite side on the clamp bolt 12 here, instead of the previously described connection plate 29, only a support plate 49 is disposed, which is stayed on the side jaw 8b of the support unit and on it is guided displaceably in the displacement direction 10 of the height or inclination adjustment and is preferably secured against torsion.

In this embodiment example only a first arrest element 21a and a first securement element 28a is provided, and a device is also omitted (for example, the previously described pyrotechnical element 45, with which the arrest element can optionally be pulled back in the event of a crash).

Figure 11:
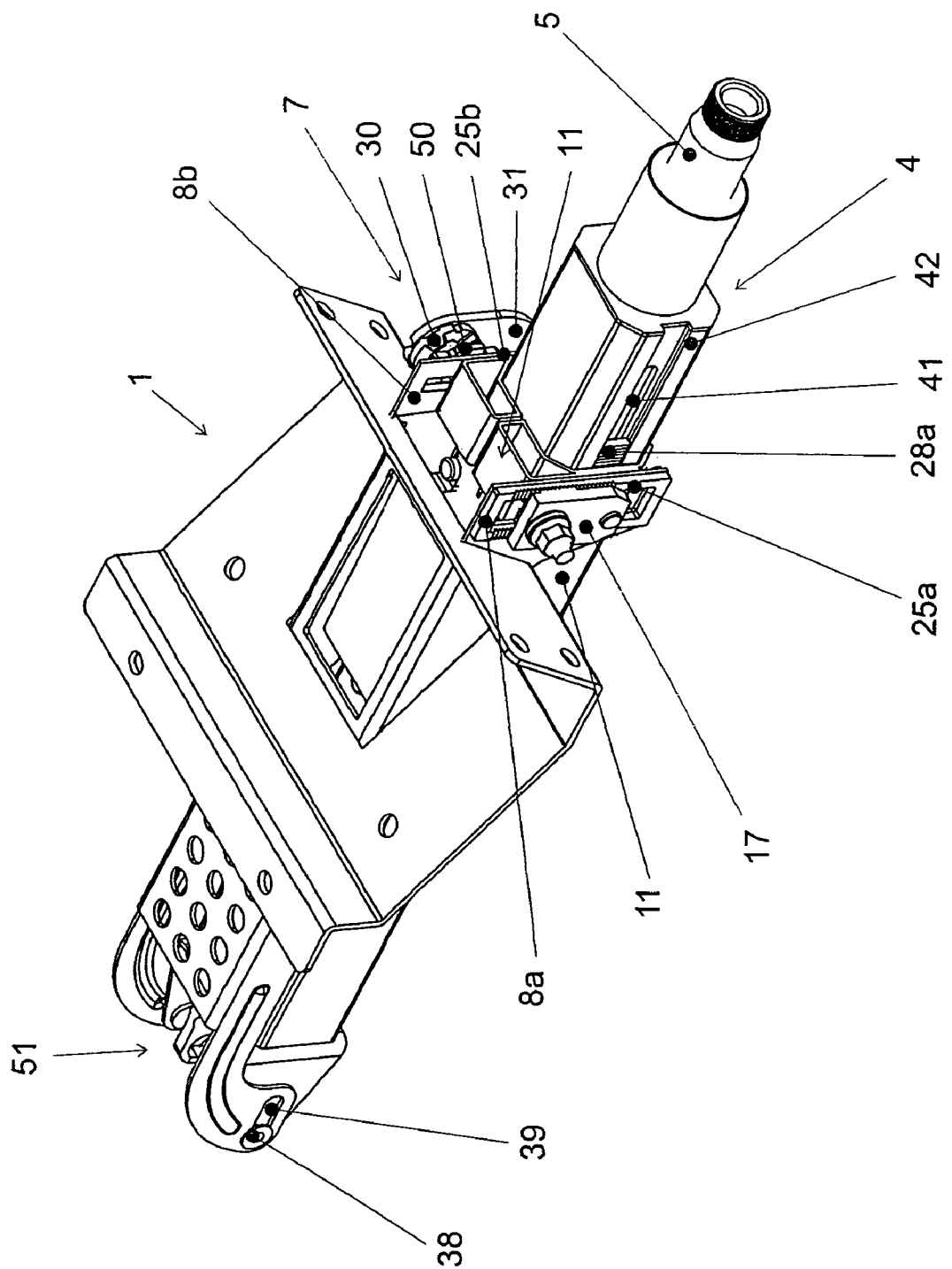
FIG. 11 is an oblique view of a further embodiment of a steering column according to the invention.

A further slightly modified embodiment is depicted in FIG. 11. The support unit 1 is here formed in one piece. The arrest elements and the associated securement elements for the length adjustment and the height adjustment, on the one hand, and the clamp members of the clamping mechanism, on the other hand, are here disposed on opposite sides of the setting unit 4. The clamp member 30 rotatable by clamping lever 31 here consequently cooperates with a clamp member 50 comprising the oblique or ramp faces, which member is a part independent of the height arrest element 17 (while in the embodiment example according to FIG. 1 to FIG. 10 a combined part was provided).

The intermediate unit 11 in this embodiment example is implemented somewhat differently in terms of shape, however, and fulfills again the same function (i.e., it bearing-supports the setting unit such that it is displaceable in the longitudinal direction 9 and itself is bearing-supported such that it is displaceable in the displacement direction 10 with respect to the support unit 1). The intermediate unit 11, again, encompasses annularly the setting unit 4.

Various further modifications are conceivable and feasible without leaving the scope of the invention. For example, on both sides of the setting unit 4 could be provided height securement elements 17, 20 cooperating with one another.

A steering column according to the invention could also be implemented such that it is for example only adjustable in the longitudinal direction. In such an embodiment, the intermediate unit 11 could be omitted and the openings 13, 14 in the side jaws 8a, 8b for the clamp bolt 12 could also be formed circularly. For the first arrest element 21a in this case, a separate opening could be provided in the corresponding side jaw 8a, 8b of the support unit 1, which holds the first arrest element 21a, 21b such that it is nondisplaceable in the longitudinal direction 9 of the steering column. The force transfer of a force acting in the closed state of the clamping mechanism 7 in the longitudinal direction of the steering column onto the setting unit 4 would here be transferred from at least one of the securement elements 28a, 28b onto at least one arrest element 21a, 21b, and from it via the edge of the opening in the side jaw 8a, 8b, through which it penetrates, onto the support unit 1.

For the case that, as described, an intermediate unit 11 is provided, the at least one arrest element 21a, 21b could also be held through the particular opening in the side jaw 8a, 8b such that it is nondisplaceable in the longitudinal direction 9 of the steering column. The intermediate unit 11 in this case would not extend over the region in which is located the at least one arrest element 21a, 21b.

Even without an intermediate unit 11, a steering column according to the invention could be implemented which is adjustable in the longitudinal direction 9 as well as also in the height or inclination direction. In the setting unit 4 could here also be provided elongated holes penetrated by clamp bolt 12, which holes extend in the longitudinal direction 9 of the steering column. The setting unit 4 could for this purpose comprise at least one part projecting upwardly (or downwardly) and rigidly connected with the jacket tube supporting the steering spindle, in which part these elongated holes are disposed.

It would also be conceivable and feasible that the elongated holes 41 are disposed directly in the jacket tube pivotably bearing-supporting the steering spindle 5.

The solutions shown in the embodiments of the invention offer the advantage that in the event of a crash or also in the event the driver leans on the steering wheel, only a small portion of the occurring forces are introduced into the clamping system 7. The operating force for the tightening and releasing of the clamping mechanism can thereby be laid out to be relatively low.

As is evident in the above description, the scope of the invention is not limited to the depicted embodiments but rather should be determined with reference to the enclosed claims together with their full range of feasible equivalents. While the preceding description and the drawing represent the invention, it is obvious to a person of skill in the art that various modifications can be carried out therein without leaving the true spirit and scope of the invention.

LEGEND TO THE REFERENCE NUMBERS

1 Support unit
2 Bracket part
3 Bracket part
4 Setting unit
5 Steering spindle
6 End
7 Clamping mechanism
8a Side jaw
8b Side jaw
9 Longitudinal direction
10 Displacement direction
11 Intermediate unit
12 Clamp bolt
13 Opening
14 Opening
15 Opening
16 Opening
17 Height arrest element
18 Toothing
19 Toothing
20 Height securement element
21a Arrest element
21b Arrest element
22 Bolt
23 Opening
24 Opening
25a Side shank
25b Side shank
26 Toothing
27 Toothing
28a Securement element
28b Securement element
29 Connection plate
30 Clamp member
31 Clamping lever
32 Oblique face
33 Cam extension
34 End piece
35 End piece
36a Spring
36b Spring
37 Swivel axis
38 Swivel bolt
39 Elongated hole
40 Bolt
41 Elongated hole
42 Energy absorption part
43 Widening
44 Widening
45 Pyrotechnical element
46 Fastening part
47 Holding bolt
48 Bore
49 Support plate
50 Clamp member
51 Universal joint

The invention claimed is:

1. A motor vehicle steering column adjustable at least in a longitudinal direction of said steering column, said steering column comprising:
a support unit to be connected to a chassis of a motor vehicle, said support unit comprising side jaws;
a setting unit, said side jaws of said support unit being located on opposite sides of said setting unit;
a securement element connected to said setting unit;
a clamping mechanism including a clamp bolt penetrating through openings in said side jaws, and including an arrest element cooperating with said securement element, said setting unit being displaceable with respect to said support unit at least in the longitudinal direction of said steering column when said clamping mechanism is in an open state, and said setting unit being non-displaceable in a secure set position with respect to said support unit when said clamping mechanism is in a closed state; and
an energy absorption mechanism retaining said securement element to said setting unit such that, during a normal operation of said steering column, said securement element is held to said setting unit so as to be non-displaceable in the longitudinal direction of said steering column with respect to said setting unit, and such that, in the event of an impact to said steering column, said securement element is displaceable in the longitudinal direction of said steering column with respect to said setting unit;
wherein said support unit, said setting unit, said securement element, and said clamping mechanism are arranged and configured such that:
when said clamping mechanism is in the open state, said arrest element is in a first position spaced apart from said securement element in an axial direction of said clamp bolt of said clamping mechanism;
during closing of said clamping mechanism, said arrest element is displaced in the axial direction of said clamp bolt toward said securement element and into a second position, said arrest element being engaged with and clamped to said securement element in the second position when said clamping mechanism is in the closed state; and
said arrest element penetrates through an opening in one of said side jaws of said support unit, said opening having edges for retaining said arrest element within said one of said side jaws such that said arrest element is non-displaceable in the longitudinal direction of said steering column, wherein said arrest element is located entirely on one side of said clamp bolt.

2. The steering column of claim 1, wherein said securement element comprises a bolt extending toward said setting unit, said bolt being guided in an elongated hole in said energy absorption mechanism on said setting unit, said bolt being configured to widen said elongated hole upon a displacement of said setting unit in the event of an impact in the longitudinal direction of said steering column with respect to said securement element.

3. The steering column of claim 1, wherein said arrest element and said securement element engage into each other under positive locking in the closed state of said clamping mechanism.

4. The steering column of claim 1, wherein said steering column is height or inclination adjustable, and wherein said support unit, said setting unit, said securement element, and said clamping mechanism are arranged and configured such that, to secure said setting unit in a height or inclination direction, a height arrest element is displaced in the axial direction of said clamp bolt and is clamped to a height securement element connected to said support unit during the closing of said clamping mechanism.

5. The steering column of claim 4, wherein said height arrest element and said height securement element engage into each other under positive locking in the closed state of said clamping mechanism.

6. The steering column of claim 4, wherein said support unit, said setting unit, said securement element, and said clamping mechanism are arranged and configured such that, to secure said setting unit in a height or inclination direction, an intermediate unit is guided so as to be displaceable with respect to said support unit and is held so as to be non-displaceable with respect to said setting unit, and said setting unit is guided so as to be displaceable in the longitudinal direction of said steering column in said intermediate unit, and said intermediate unit is held so as to be non-displaceable in the longitudinal direction of said steering column with respect to said support unit, said intermediate unit being disposed between said side jaws and said setting unit and having an opening through which said arrest element penetrates.

7. The steering column of claim 1, wherein said securement element is connected in a region of a plane with said setting unit pivotably supporting said steering spindle, said plane extending through a longitudinal axis of said steering spindle and being oriented at a right angle to a vertical plane extending through said longitudinal axis of said steering spindle.

8. The steering column of claim 1, wherein said arrest element is secured in position on a height arrest element.

9. The steering column of claim 1, further comprising a device for bringing said arrest element out of engagement with said securement element in the closed state of said clamping mechanism after a predetermined time or a predetermined displacement distance in the event of an impact to said steering column.

10. The steering column of claim 9, wherein said device comprises a pyrotechnical element for pulling said arrest element in the axial direction of said clamp bolt.

11. The steering column of claim 1, wherein said arrest element comprises a first arrest element on a first side of said setting unit, and said securement element comprises a first securement element on said first side of said setting unit, further comprising a second arrest element and a second securement element on a second side of said setting unit.

12. The steering column of claim 1, further comprising a swivel axis for adjusting a height of said steering column, said swivel axis including a swivel bolt secured in position on an intermediate unit and rotatably supported in said support unit, said intermediate unit being disposed between said side jaws and said setting unit and having an opening through which said arrest element penetrates.

13. The steering column of claim 12, wherein said swivel axis is displaceable along an elongated hole in said support unit in the event of an impact to said steering column.

14. The steering column of claim 13, wherein the displacement of said swivel axis takes place along said elongated hole under energy absorption in the event of an impact to said steering column.

15. The steering column of claim 1, wherein said arrest element further penetrates an opening in a side shank of an intermediate unit disposed between said side jaws and said setting unit.

16. The steering column of claim 1, further comprising a swivel axis for allowing adjustment of said steering column in height or inclination by swiveling said steering column about said swivel axis, said swivel axis being defined by a swivel bolt guided displaceably in an elongated hole.

17. The steering column of claim 16, wherein said swivel bolt is displaceable in said elongated hole under energy absorption.

18. The steering column of claim 16, wherein said elongated hole extends in the longitudinal direction of said steering column.

19. The steering column of claim 16, further comprising an intermediate unit between said side jaws and said setting unit, said setting unit being adjustably positioned with respect to the support unit when said clamping mechanism is in the open state, said intermediate unit being guided displaceably with respect to said support unit in the direction of the height or the inclination adjustment, and is held non-displaceably with respect to said setting unit, and said setting unit is guided displaceably in the longitudinal direction of the steering column with respect to said intermediate unit, and said support unit is non-displaceable.

20. The steering column of claim 19, wherein said elongated hole or said swivel bolt is disposed in or on said intermediate unit, and a second swivel bolt cooperating with a second elongated hole is disposed on or in said support unit.

* * * * *